United States Patent [19]
Gladrow et al.

[11] 4,208,269
[45] Jun. 17, 1980

[54] HYDROCARBON CRACKING USING COMBINED PEROVSKITE AND ZEOLITE CATALYST

[75] Inventors: Elroy M. Gladrow; Kenneth S. Wheelock, both of Baton Rouge, La.

[73] Assignee: Exxon Research & Engineering Co., Florham Park, N.J.

[21] Appl. No.: 22,114

[22] Filed: Mar. 19, 1979

Related U.S. Application Data

[62] Division of Ser. No. 850,038, Nov. 9, 1977.

[51] Int. Cl.² .................. C10G 11/04; B01J 8/24
[52] U.S. Cl. ...................... 208/120; 208/DIG. 2; 208/123; 423/328
[58] Field of Search .......................... 208/120

[56] References Cited

U.S. PATENT DOCUMENTS

| | | | |
|---|---|---|---|
| 2,854,400 | 9/1958 | Weisz | 208/111 |
| 3,450,789 | 6/1969 | Kehl et al. | 260/680 |
| 3,595,809 | 7/1971 | Kehl | 252/462 |
| 3,718,553 | 2/1973 | Stover | 208/120 |
| 3,835,032 | 9/1974 | Dolbear et al. | 208/120 |
| 3,957,623 | 5/1976 | McDaniel et al. | 208/120 |
| 4,055,513 | 10/1977 | Wheelock | 252/462 |
| 4,102,777 | 7/1978 | Wheelock | 208/121 |

*Primary Examiner*—Delbert E. Gantz
*Assistant Examiner*—G. E. Schmitkons
*Attorney, Agent, or Firm*—Marthe L. Gibbons

[57] ABSTRACT

A perovskite is added to a conventional hydrocarbon cracking catalyst comprising a zeolite and an inorganic oxide gel matrix. The perovskite is present in said catalyst in an amount up to about 10 weight percent based on the total catalyst.

20 Claims, No Drawings

HYDROCARBON CRACKING USING COMBINED PEROVSKITE AND ZEOLITE CATALYST

This is a division of application Ser. No. 850,038, filed Nov. 9, 1977.

BACKGROUND OF THE INVENTION

1. Field of the Invention

The present invention relates to a cracking catalyst comprising a perovskite and uses thereof in hydrocarbon cracking processes.

2. Description of the Prior Art

Catalytic cracking processes in which a hydrocarbonaceous oil is converted to lower boiling hydrocarbon products in the presence of cracking catalysts are well known.

Hydrocarbon conversion catalysts comprising a zeolite dispersed in a siliceous matrix are known, see, for example, U.S. Pat. No. 3,140,249 and U.S. Pat. No. 3,352,796. Hydrocarbon conversion catalysts comprising a physical mixture of silica and a crystalline aluminosilicate zeolite in a siliceous matrix are also known, see, for example, U.S. Pat. No. 3,558,476.

U.S. Pat. No. 3,780,126 discloses the use of manganese compounds of the perovskite structure as catalysts for the oxidative dehydrogenation of hydrocarbons.

U.S. Pat. No. 3,450,789 discloses the use of a lanthanum chromium ferrite perovskite catalyst for the oxidative dehydrogenation of hydrocarbons.

U.S. Pat. No. 3,595,809 discloses a lanthanum ferrite perovskite catalyst as hydrocarbon conversion catalyst, e.g. butene-2 to butadiene. The catalyst can be employed with a carrier.

It has now been found that improved hydrocarbon cracking results can be obtained with a cracking catalyst comprising a perovskite component.

SUMMARY OF THE INVENTION

In accordance with the invention there is provided a catalyst comprising (1) a crystalline aluminosilicate zeolite, (2) an inorganic oxide gel, and (3) an effective amount of a perovskite having at least one transition metal cation.

Furthermore, in accordance with the invention there is provided a process for the conversion of a hydrocarbonaceous oil to lower boiling hydrocarbon products which comprises: contacting said oil at catalytic cracking conditions with a catalyst comprising (1) a crystalline aluminosilicate zeolite, (2) an inorganic oxide gel, and (3) a perovskite having at least one transition metal cation. The term "transition metal" is used herein to designate elements of the Periodic Table of Elements having atomic numbers ranging from 21 through 30, from 39 through 48, from 57 through 80, and from 89 through 92.

DESCRIPTION OF THE PREFERRED EMBODIMENT

The catalyst composition of the present invention will comprise generally a crystalline aluminosilicate zeolite, an inorganic oxide gel, a perovskite having at least one transition metal cation, and, optionally, a catalytically inert porous material.

ZEOLITE COMPONENT

The crystalline aluminosilicate zeolite component of the present invention may be chosen from any of the known zeolites. Examples of these zeolites include the zeolites designated by the Linde Division of Union Carbide Corporation by the letters X, Y, A, L (these zeolites are described in U.S. Pat. Nos. 2,882,244; 3,130,007; 3,882,243 and Belgian patent 575,117, respectively) as well as the naturally occurring crystalline zeolites such as faujasite, chabazite, erionite, mordenite, offretite, gmelinite, analcite, etc.

In general, the chemical formula of anhydrous crystalline aluminosilicate zeolite expressed in terms of moles may be generally represented as follows:

$$0.9 \pm 0.2 M_{2/n}O : Al_2O_3 : ZSiO_2$$

wherein M is selected from the group consisting of hydrogen, monovalent, divalent and trivalent metal cations and mixtures thereof, n is the valence of the cation and Z is a number from about 1.5 to about 12, said value being dependent upon the particular type of zeolite. The zeolites as produced or found in nature normally contain an alkali metal such as sodium, and/or potassium and/or an alkaline earth metal such as calcium and magnesium. The zeolites differ from each other in structure, composition and particularly in the ratio of silica to alumina contained in the crystal lattice structure. For use in hydrocarbon conversion processes, the higher silica to alumina ratio among isostructural zeolites are preferred because of their higher stability at elevated temperature, particularly in the presence of steam. Therefore, whereas the zeolite component of the present invention may be any of the above stated zeolites, the zeolites having silica to alumina ratios above 3 will be preferred. This includes natural and synthetic faujasite and mordenite. Typical among these zeolites is the synthetic faujasite variety wherein Z in the above formula is about 2.3 to 7, preferably 3 to 6, more preferably 4.5 to 5.5. A high silica to alumina ratio zeolite is zeolite Y. Type X zeolite wherein Z in the above formula is less than 3, e.g. 2.5, may also be used to advantage although the most preferred zeolite components for use in the catalyst of the present invention will be those having a silica to alumina ratio greater than 3. The crystalline zeolites have uniform pore openings ranging in diameter from about 3 to about 15 Angstroms. The preferred pore size catalyst for use as zeolite component in the present invention will be zeolites having uniform pore size diameters ranging from about 6 to about 15 Angstroms. For use as hydrocarbon conversion catalyst component, it is usually necessary to reduce the alkali metal content of the crystalline aluminosilicate zeolite to a content of less than 10 weight percent, preferably less than 6 weight percent, more preferably from about 1 to about 5 weight percent since the alkali metal components are normally undesirable catalytic components for the desired hydrocarbon conversion reactions. The alkali metal content reduction may be accomplished, as is well known in the art, by exchange with one or more of the cations selected from Group IB through Group VIII metals of the Periodic Table of Elements (the Periodic Table referred to herein is given in the Handbook of Chemistry and Physics, published by Chemical Rubber Publishing Co., Cleveland, Ohio, 45th edition 1964), as well as hydrogen cation or hydrogen precursor (i.e. $NH_4^+$) capable of conversion to hydrogen cation. The preferred cations are those selected from the group consisting of rare earth metals, calcium, magnesium and hydrogen or mixtures thereof. Desirably, the zeolite comprises from about 3 to about 20, preferably from about 5 to about 16 weight percent of the total catalyst.

INORGANIC OXIDE GEL COMPONENT

Inorganic oxide gels suitable as components of the catalysts of the present invention are amorphous catalytic inorganic oxides such as silica, silica-alumina, silica-zirconia, silica-magnesia, alumina-boria, alumina-titania and the like and mixtures thereof. Preferably, the inorganic oxide gel is a silica-containing gel in which silica is present in major amounts (e.g. more than 50 weight percent), more preferably the inorganic oxide gel is an amorphous silica-alumina component such as a conventional silica-alumina cracking catalyst, several types and compositions of which are commercially available. These materials are generally prepared as a co-gel of silica and alumina or as alumina precipitated on a preformed and preaged silica hydrogel. In general, silica is present as the major component in the catalytic solids present in such gels, being present in amounts ranging between about 55 and 100 weight percent, preferably the silica will be present in amounts ranging from about 70 to about 90 weight percent. Particularly preferred are two cogels, one comprising about 75 weight percent silica and 25 weight percent alumina and the other comprising about 87 weight percent silica and 13 weight percent alumina. The inorganic oxide gel component will suitably be present in the catalyst of the present invention in an amount ranging from about 45 to about 95 weight percent, preferably from about 60 to about 90 weight percent, based on the total catalyst.

THE PEROVSKITE COMPONENT

The term "perovskite" is intended herein to designate metal oxides having the ideal and non-ideal perovskite-type crystalline structure. The ideal perovskite crystalline structure is defined by the empirical formula $ABO_3$ in which A and B are cations of two different metals and in which the A cation is coordinated to 12 oxygen atoms while the B cation occupies octahedral sites and is coordinated to 6 oxygen atoms. The ideal perovskite structure is cubic; however, few compounds have this ideal structure. The term "perovskite" structure draws its name from the mineral perovskite ($CaTiO_3$) which was first thought to have a cubic structure that has now been determined to be orthorhombic. For example, the compound $LaMnO_3$ has the ideal structure while some complex oxides such as $La_{0.7}Sr_{0.3}MnO_3$, which exhibit a variety of other structures, are still classed as perovskite-type structures. A more complex description of the perovskite-type structure is found in *Structural Inorganic Chemistry*, A. F. Wells, Third Edition, Oxford, The Clarendon Press, 1962, pages 494–499. In general, the algebraic sum of the ionic charges of the two or more metals (cations) of the perovskite equals plus 6. Suitable perovskites as component of the catalyst of the present invention include perovskites having at least one transition metal cation, preferably perovskites having at least two transition metal cations. Preferred transition metal cations of the perovskites include lanthanum, cobalt, cerium, hafnium, chromium, zirconium and mixtures thereof. A preferred perovskite is $LaCoO_3$. Desirably, the perovskite is added to the catalyst composition in an amount ranging from about 0.5 to about 10 weight percent, based on the total catalyst, preferably from about 1.5 to about 4 weight percent of the total catalyst. If desired, the perovskite may be dispersed in the inorganic oxide gel by conventional means, that is, by preforming the perovskite in a finely divided form, e.g., particle size of less than about 1 micron, slurrying it in an aqueous medium, and then blending with the inorganic oxide hydrogel before drying the mixture.

INERT POROUS COMPONENT

Optionally, a catalytically inert porous material may be present in the finished catalyst. The inert porous component may be chosen from a wide variety of solid porous catalytically inert materials. By the term "catalytically inert" is intended herein that the porous material has substantially no catalytic activity or less catalytic activity than the inorganic gel component of the catalyst. Preferably, the inert component will be an adsorptive bulk material. The term "bulk" with reference to the adsorptive inert component is intended herein to designate a material which has been preformed and placed in a physical form such that its surface area and pore structure are stabilized so that when it is added to an impure inorganic gel containing considerable amounts of residual soluble salts, the salts will not alter the surface and pore characteristics measurably nor will they promote chemical attack on the preformed porous inert material which could then undergo change. For example, the addition of "bulk" alumina will mean a material which has been formed by suitable chemical reaction, the slurry aged, filtered, dried, washed free of residual salts and then heated to reduce its content of volatile material to less than 15 weight percent. The resulting inert porous adsorbent is suitable for use as an optional component of the catalyst of the present invention. Suitable inert porous material for use in the catalyst of the present invention include alumina, titania, silica, zirconia, magnesia and mixtures thereof. Preferably, the porous inert material is a bulk alumina. Any type of alumina is suitable provided that it be porous and substantially inert. The porous inert material, when used as a component of the catalyst of the present invention, is suitably present in the finished catalyst in an amount ranging from about 15 to about 40 weight percent, preferably from about 20 to about 35 weight percent based on the total catalyst. Instead of adding the porous inert material as a separate component to the catalyst, a supported perovskite may be used wherein the porous inert material would be comprised in the support of the perovskite. Suitable supported perovskites for use in the catalyst of the present invention to provide the perovskite component as well as the inert porous component are described in U.S. application Ser. No. 676,511, filed Apr. 13, 1976, now U.S. Pat. No. 4,055,513, the teachings of which are hereby incorporated by reference.

The catalyst of the present invention may be prepared by any one of several methods. The preferred method of preparing a catalyst of the present invention is to make an inorganic oxide hydrogel and separate aqueous slurries of the zeolite, if desired, the inert porous material, and the perovskite. The slurries are blended into the hydrogel and the mixture is homogenized. The resulting homogeneous mixture is spray-dried and washed free of extraneous soluble salts using, for example, a dilute ammonium sulfate solution and water. After filtering, the resulting catalyst is calcined to reduce the volatile content to less than 12 weight percent. The amounts of each slurry used to blend with the inorganic oxide hydrogel can be varied to produce the desired final composition of the catalyst.

The catalyst of the present invention is particularly suited as a catalytic cracking catalyst for the conversion of hydrocarbonaceous feeds to lower boiling hydrocarbon products. Catalytic cracking with a catalyst of the present invention can be conducted in any conventional catalytic cracking manner. Suitable catalytic cracking conditions include a temperature from about 700° to about 1200° F., preferably from about 850° to about 1025° F. and a pressure ranging from about subatmospheric to several hundreds of atmospheres, preferably from about 0 to 150 psig, more preferably from about 0 to 50 psig.

The catalyst of the present invention can be used to convert any of the conventional hydrocarbon feeds used in catalytic cracking, that is, to crack heavy naphtha; gas oils, that is, a mixture of hydrocarbons boiling at atmospheric pressure from about 430° F. to about 1100° F., typically from about 600° to 1050° F., and residual oils including heavy crudes and residua having a high content of metal contaminants, e.g. atmospheric petroleum residua or vacuum residua. The catalytic cracking process of the present invention may be carried out in a fixed bed, a moving bed, and an ebullient bed, slurry, transferline or fluidized bed operation.

The following examples are presented to illustrate the invention.

EXAMPLE 1

A perovskite having the empirical formula of $LaCoO_3$ was made as follows:

In a vessel, dissolve 176.6 grams $La(NO_3)_3.6H_2O$ and 119.4 grams $Co(NO_3)_2.6H_2O$ in sufficient $H_2O$ to make 1 liter of solution.

In a second vessel, dissolve 200 grams $(NH_4)_2CO_3$ in water. Add 200 cc concentrated $NH_4OH$ (28% wt. $NH_3$) and bring to 2 liters total volume with water.

With stirring, add the mixed lanthanum/cobalt solution to the ammoniacal carbonate solution. A bright purple flocculent precipitate was formed. The mixture was gently heated and evaporated to dryness in the presence of air over a period of several days during which time the cobalt was oxidized to the +3 state (by oxygen in the air) and the precipitated mass turned black. The dried material was then placed in a vacuum oven at 338° F. for 3 hours, and then calcined in air for 16 hours at 1730° F. X-ray analysis showed the characteristic perovskite crystal structure (about 97–99% purity) for $LaCoO_3$ with a small amount of excess $La_2O_3$.

The calcined material was ball milled for 16 hours and the milled product used in making cracking catalysts as described in subsequent examples.

EXAMPLE 2

A catalyst of the invention was made by blending a small amount of the $LaCoO_3$ from Example 1 with calcined rare earth exchanged faujasite (type Y) and impure silica/-alumina hydrogel, drying the composite and washing the dried material with $(NH_4)_2SO_4$ and water to remove residual soluble salts. The catalyst comprises 1% $LaCoO_3$/11% calcined rare earth exchanged faujasite (type Y)/88% silica-alumina and is designated herein "A". The calcined rare earth faujasite is made by exchanging about 67 to 95% of the sodium ions of the faujasite using a solution of mixed rare earth cations, predominantly lanthanum, cerium, praseodymium and neodymium, filtering, drying and calcining the exchanged faujasite for at least 0.5 hours at a temperature ranging from about 800° to about 1400° F. in air or with steam added. The resulting rare earth exchanged faujasite comprised 23.4 weight percent rare earth metal constituents as oxide.

EXAMPLE 3

A catalyst of the invention was made by blending a larger amount of $LaCoO_3$ from Example 1 with the same calcined rare earth exchanged faujasite (type Y) as given in Example 1 and impure silica/alumina hydrogel, drying, and washing to remove extraneous soluble salts. The catalyst comprises 5% $LaCoO_3$/11% calcined rare earth exchanged faujasite (type Y)/84% silica-alumina and is designated "B".

EXAMPLE 4

A comparative catalyst was made by blending the same calcined rare earth exchanged faujasite (type Y) and impure silica/alumina hydrogel, drying and washing to remove extraneous soluble salts. The comparative catalyst comprises 11% calcined rare earth exchanged faujasite (type Y)/89% silica-alumina and is designated "C".

EXAMPLE 5

Catalysts "A", "B" and "C" were each calcined 16 hours at 1000° F. and then steamed at 1400° F. for 16 hours and 0 psig. The catalysts were tested in a batch fluid bed unit feeding a 500°–700° F. boiling range virgin gas oil at 950° F. over a 2 minute cycle period. Summarized data in Table I below compare the catalysts at a common conversion level of 75 wt. %

TABLE I

| Catalyst | "A" | "B" | "C" |
| --- | --- | --- | --- |
| At 75% Conv.: | | | |
| W/Hr./W | 13.0 | 12.6 | 12.4 |
| Carbon, % | 2.2 | 2.4 | 2.2 |
| $C_5$/430, Wt. % | 56.0 | 55.6 | 56.7 |
| $C_3H_6$, Wt. % | 4.0 | 4.1 | 3.8 |
| $H_2$, SCF/B | 55 | 91 | 24 |

The data show that catalysts "A" and "B", which are catalysts in accordance with the invention, are at least as active as the reference catalyst "C". In addition, yields of coke and $C_5$/430° F. naphtha are about the same among all three catalysts. However, yields of $C_3H_6$ (and presumably other light olefins) and $H_2$ for catalysts "A" and "B" are slightly higher, indicating a small dehydrogenation property of catalysts "A" and "B" due to the added $LaCoO_3$. These are indications that the naphtha would likely be more aromatic and have a higher octane number rating than that naphtha obtained from "C".

EXAMPLE 6

A catalyst, in accordance with the present invention, was made by admixing a minor amount of $LaCoO_3$ from Example 1 with the same calcined rare earth exchanged faujasite (type Y) as given in Example 1, bulk hydrous alumina and impure silica-alumina hydrogel, spray drying the mixture and washing the product free of soluble impurities. The catalyst had a composition of 2% $LaCoO_3$/11% calcined rare earth exchanged faujasite (type Y)/28% bulk $Al_2O_3$/59% silica-alumina and is designated "D".

EXAMPLE 7

A comparative catalyst was made exactly like catalyst "D" except no $LaCoO_3$ was added. This catalyst has a composition of 11% calcined rare earth exchanged faujasite (type Y)/29% $Al_2O_3$/60% silica-alumina and is designated "E".

EXAMPLE 8

Catalysts "D" and "E" were each calcined 16 hours at 1000° F. and then steamed 16 hours at 1400° F. and 0 psig. They were tested for cracking performance as described in Example 5 above. Data are summarized in Table II below at a common 75% conversion level.

TABLE II

| Catalyst | "D" | "E" |
|---|---|---|
| At 75% Conv.: | | |
| W/Hr./W | 13.1 | 11.3 |
| Carbon, % | 0.9 | 2.3 |
| $C_5$/430° F., Wt. % | 55.2 | 54.6 |
| $C_3H_6$, Wt. % | 4.9 | 4.2 |
| $H_2$, SCF/B | 75 | 48 |

The data show the high activity and superior product distribution for the catalyst "D", which is a catalyst in accordance with the invention, as compared to comparative catalyst "E". Note again that light olefin yield was improved and there was an increase in $H_2$ yield which indicates the naphtha to have an improved octane number over that with comparative catalyst "E" which did not contain the perovskite.

EXAMPLE 9

Another comparative catalyst is a widely used commerical cracking catalyst. It is believed to contain about 16% rare earth exchanged faujasite (type Y) in a matrix of kaolin and silica-alumina gel. It is designated "F" in the next example. It contains about 3.6 weight percent rare earth metal constituents as oxide in the total catalyst.

EXAMPLE 10

Catalysts "D" and "F" were each steamed 16 hours at 1400° F. and 0 psig and then used as catalyst in a continuous transferline type cracking operation feeding a heavy gas oil (27.5° API gravity). The results are summarized in Table III below and the catalysts compared at the same 75 Vol. % conversion.

TABLE III

| Catalyst | "D" | "F" |
|---|---|---|
| Relative Activity | 1.32 | 1.00 |
| $CO_2$/CO Ratio in Regen. Flue Gas | ∞ | 0.96 |
| Carbon, % | 5.2 | 3.0 |
| Hydrogen, Wt. % | 0.14 | 0.04 |
| $C_5$/430° F., Vol. % | 62.1 | 64.2 |
| API Gravity | 59.7 | 62.6 |
| RON-Clear | 91.1 | 89.3 |

The data show the high activity of the catalyst "D" of the present invention. The data show a marked increase in the octane rating of the naphtha of 1.8 research octane numbers (91.1 vs. 89.3). Also the lower API gravity of the naphtha suggests that the octane improvement may result from a higher aromatic content in the naphtha relative to reference catalyst "F". There is a higher coke and a higher $H_2$ yield with catalyst "D"; these can be suitably used in a modern refinery using high temperature regeneration. Likewise, the higher $H_2$ content in the light ends can be efficiently utilized. Surprisingly, it is noted that the catalyst of the invention, "D", effectively promotes the oxidation of CO to $CO_2$ in the regenerator, thus achieving greater heat generation and recovery.

EXAMPLE 11

Catalysts "D" and "F" were each steamed 16 hours at 1400° F. and 0 psig and then used as the catalyst in a continuous transferline type cracking operation feeding a heavy gas oil (27.5° API gravity). The operation was conducted at 925° F. in the reactor. In Table IV, the catalysts are compared at a common space velocity of 15 W/Hr./V and a common 70 vol. % conversion.

TABLE IV

| Catalyst | "D" | "F" |
|---|---|---|
| Relative Activity | 1.24 | 1.00 |
| $CO_2$/CO Ratio in Regen. Flue Gas | ∞ | ∞ |
| Carbon, % | 2.7 | 2.7 |
| Hydrogen, Wt. % | 0.24 | 0.03 |
| $C_5$430° F., Vol % | 64.2 | 60.1 |
| API Gravity | 57.3 | 56.9 |
| RON-Clear | 90.5 | 89.7 |

The data show that the catalyst "D", which is a catalyst in accordance with the present invention, is markedly superior to the standard commercial reference catalyst "F". The activity of "D" is higher; the regenerability of "D" is superior because it produces the maximum amount of heat from the coke on the spent catalyst and in so doing reduces pollutants in the regenerator flue gas that is vented to the atmosphere; more importantly, the yield of $C_5$/430° F. naphtha and the clear octane number of the naphtha are improved; there is no difference in carbon yields with catalyst "D" and "F". There is a noticeable increase in hydrogen yields for "D" over "F" and it is believed that this is a property of the catalyst of the present invention which leads to a higher octane number naphtha by selective dehydrogenation which does not affect naphtha yield.

EXAMPLE 12

Experiments were performed with perovskite promoted cracking catalysts having the following general formula: 11 weight percent calcined rare earth exchanged Y-type faujasite, 29 weight percent bulk alumina; 58 weight percent silica-alumina gel (75 weight percent silica and 25 weight percent alumina, based on the gel); and 2 weight percent of a perovskite. These catalysts were compared against a standard catalyst wherein the composition had been changed by increasing the amount of the above defined silica-alumina gel to 60 weight percent of the catalyst, that is, having the same amount of faujasite and bulk alumina and eliminating the perovskite component. Furthermore, all the perovskite-containing catalysts comprised at least one transition metal, except catalyst P, which comprised $SrSnO_3$ as the perovskite. Tests were made in small batch units at 900° F. using as feed a 500° to 800° F. boiling range virgin gas oil cut from a West Texas Devonian crude. The results of these experiments are summarized in Table V.

TABLE V

| Catalyst No. | Perovskite Promoter | Gas ($H_2$) Producing Factor | Carbon Producing Factor | Percent Conversion |
|---|---|---|---|---|
| G | $LaCoO_3$ | 4.03 | 0.89 | 82.1 |
| H | $La_{0.9}Ce_{0.1}CoO_3$ | 3.66 | 1.07 | 81.2 |
| I | $LaCo_{0.9}Cr_{0.1}O_3$ | 3.04 | 0.90 | 80.4 |
| J | $LaCrO_3$ | 3.10 | 0.94 | 79.7 |
| K | $CaHfO_3$ | 2.90 | 0.83 | 80.1 |
| L | $SrHfO_3$ | 2.10 | 1.19 | 72.1 |
| M | $BaHfO_3$ | 0.86 | 2.12 | 79.4 |
| N | $SrZrO_3$ | 1.94 | 0.78 | 80.3 |
| O | $BaZrO_3$ | 2.72 | 0.79 | 80.2 |
| P | $SrSnO_3$ | 1.74 | 0.86 | 77.7 |
| Q | None (ref. std.) | 1.80 | 0.93 | 81.6 |

Referring to the above given table and interpreting the gas producing factor as an index of hydrogen production and, therefore, an increased olefin and aromatics content in the liquid product and hence a liquid product with a higher octant number, it can be seen that the incorporation of a perovskite having at least one transition metal improved product octane as indicated by slightly higher gas (hydrogen) producing factor. Incorporation of a perovskite comprising two transition metals gave a catalyst of comparable activity as the reference standard catalyst (catalyst Q) and improved octane numbers. Catalyst "P" comprised 2 weight percent $SrSnO_3$, which has a perovskite structure but which contains no transition metal as hereinbefore defined, and hence is not a catalyst in accordance with the present invention.

What is claimed is:

1. A process for the conversion of a hydrocarbonaceous oil to lower boiling hydrocarbon products, which comprises: contacting said oil at catalytic cracking conditions with a catalyst comprising (1) a crystalline aluminosilicate zeolite, (2) an inorganic oxide gel, and (3) an effective amount of a perovskite having at least one transition metal cation.

2. The process of claim 1, wherein said transition metal cation is selected from the group of elements having atomic numbers 21 to 30, 39 to 48, 57 to 80, 89 to 92, and mixtures thereof.

3. The process of claim 1, wherein said perovskite comprises at least two transition metal cations.

4. The process of claim 1, wherein said transition metal cation is selected from the group consisting of lanthanum, cobalt, cerium, hafnium, chromium, zirconium and mixtures thereof.

5. The process of claim 1, wherein said perovskite comprises from about 0.5 to about 10 weight percent of the total catalyst.

6. The process of claim 1, wherein said perovskite comprises from about 1.5 to about 4 weight percent of the total catalyst.

7. The process of claim 1, wherein said catalyst additionally comprises a substantially catalytically inert porous material.

8. The process of claim 7, wherein said catalytically inert porous material is selected from the group consisting of alumina, titania, silica, zirconia, magnesia and mixtures thereof.

9. The process of claim 7, wherein said catalytically inert porous material is bulk alumina.

10. The process of claim 1 wherein said perovskite is a supported perovskite.

11. The process of claim 10, wherein the support of said perovskite is a substantially catalytically inert porous material.

12. The process of claim 1, wherein said crystalline aluminosilicate is present in an amount ranging from about 3 to about 20 weight percent, based on the total catalyst.

13. The process of claim 1, wherein said inorganic oxide gel is a silica-containing gel.

14. The process of claim 1, wherein said inorganic oxide gel is a cogel of silica-alumina.

15. The process of claim 1, wherein said catalyst comprises from about 45 to about 95 weight percent of said inorganic oxide gel based on the total catalyst.

16. The process of claim 1, wherein said catalyst comprises a crystalline aluminosilicate zeolite having the structure of faujasite.

17. The process of claim 1, wherein said catalyst comprises (1) from about 5 to about 16 weight percent of said zeolite, (2) from about 60 to about 90 weight percent of said inorganic oxide gel, and (3) from about 1.5 to about 4 weight percent of said perovskite, said weight being based on the total catalyst, and said transition metal cation of said perovskite being selected from the group consisting of lanthanum, cobalt, cerium, hafnium, chromium, zirconium and mixtures thereof.

18. The process of claim 1, wherein said catalytic cracking conditions include a temperature ranging from about 700° to about 1200° F.

19. The process of claim 1, wherein said catalytic cracking conditions include a temperature ranging from about 850° to about 1025° F. and a pressure ranging from about 0 to about 150 psig.

20. The process of claim 1, wherein said hydrocarbonaceous oil is selected from the group consisting of naphthas, gas oils, crude oils, vacuum residuum, atmospheric residuum, heavy oils derived from coal liquefaction processes and mixtures thereof.

* * * * *